US010123291B2

(12) United States Patent
Kajitani (10) Patent No.: US 10,123,291 B2
(45) Date of Patent: *Nov. 6, 2018

(54) WIRELESS COMMUNICATION DEVICE, ELECTRONIC TIMEPIECE, WIRELESS COMMUNICATION METHOD, AND RECORDING MEDIUM

(71) Applicant: CASIO COMPUTER CO., LTD., Tokyo (JP)

(72) Inventor: Haruo Kajitani, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/836,150

(22) Filed: Dec. 8, 2017

(65) Prior Publication Data

US 2018/0110023 A1    Apr. 19, 2018

Related U.S. Application Data

(63) Continuation of application No. 15/062,343, filed on Mar. 7, 2016, now Pat. No. 9,872,264.

(30) Foreign Application Priority Data

Jun. 19, 2015    (JP) ................................. 2015-123482

(51) Int. Cl.
*H04W 56/00* (2009.01)
*G04R 20/26* (2013.01)
(Continued)

(52) U.S. Cl.
CPC ........ *H04W 56/0015* (2013.01); *G04R 20/26* (2013.01); *H04B 1/385* (2013.01); *H04W 4/80* (2018.02)

(58) Field of Classification Search
None
See application file for complete search history.

(56) References Cited

U.S. PATENT DOCUMENTS

2009/0305631 A1* 12/2009 Walley ...................... G06F 1/14
455/41.2
2013/0272099 A1* 10/2013 Yang ...................... G04R 40/00
368/13
(Continued)

FOREIGN PATENT DOCUMENTS

JP    2005-249522 A    9/2005
JP    2009-118403 A    5/2009
(Continued)

OTHER PUBLICATIONS

European Search Report dated Dec. 6, 2016 received in European Patent Application No. EP 16158649.0-1559.
(Continued)

*Primary Examiner* — Robert C Scheibel
(74) *Attorney, Agent, or Firm* — Scully, Scott, Murphy & Presser, P.C.

(57) ABSTRACT

Peripherals and send timing information presenting a timing of acquiring time information to a central. The central changes the timing in the received timing information so that the timing presented by the timing information received from the peripheral does not overlap with the timing presented by the already received timing information of the other peripheral. The central makes the peripheral change a setting of the timing information based on the changed timing information.

25 Claims, 6 Drawing Sheets

(51) Int. Cl.
  *H04B 1/3827* (2015.01)
  *H04W 4/00* (2018.01)
  *H04W 4/80* (2018.01)

(56) References Cited

U.S. PATENT DOCUMENTS

2015/0312021 A1* 10/2015 Liu .................. G04R 20/28
                                                     370/350
2016/0286511 A1*  9/2016 Yamada ............ H04W 56/0015

FOREIGN PATENT DOCUMENTS

| JP | 2013-130562 A | 7/2013 |
| JP | 2015-099983 A | 5/2015 |
| WO | 2014/020714 A1 | 2/2014 |

OTHER PUBLICATIONS

Notification of Reasons for Refusal dated Jan. 10, 2017 received in Japanese Patent Application No. JP 2015-123482 together with an English language translation.

* cited by examiner

FIG. 6

WIRELESS COMMUNICATION DEVICE, ELECTRONIC TIMEPIECE, WIRELESS COMMUNICATION METHOD, AND RECORDING MEDIUM

CROSS-REFERENCE TO RELATED APPLICATION

This application is a continuation application of U.S. patent application Ser. No. 15/062,343, filed on Mar. 7, 2016, which claims priority to Japanese Patent Application No. 2015-123482, filed on Jun. 19, 2015. The entire disclosures of U.S. patent application Ser. No. 15/062,343 and Japanese Patent Application No. 2015-123482 are incorporated by reference herein.

FIELD

This application relates generally to a wireless communication device, electronic timepiece, wireless communication method, and non-transitory recording medium.

BACKGROUND

In recent years, wireless communication devices conducting wireless communication based on Bluetooth (registered trademark), which is a short distance wireless communication standard, have increasingly been in use.

For example, Unexamined Japanese Patent Application Kokai Publication No. 2009-118403 discloses a time correction system comprising a cell-phone device and wrist watch type terminal device conducting short distance wireless communication. In this time correction system, the cell-phone device sends time information to the wrist watch type terminal device and the wrist watch type terminal device corrects the measured time based on the time information.

Triggered by a user operation or an internal event within the cell-phone device that occurs periodically, the time information is sent and received. Moreover, the time information is sent and received again if the response time of the wrist watch type terminal device to respond with notice of completion of time adjustment since the time information is sent by the cell-phone device exceeds a given time period.

When a cell-phone device and a wrist watch type terminal device conduct short distance wireless communication as in the Unexamined Japanese Patent Application Kokai Publication No. 2009-118403, the wrist watch type terminal device sends advertisement to the cell-phone device and the cell-phone device responds with a connection request, whereby the connection is established. Here, the advertisement is notification information for giving notice of presence of the self.

A prerequisite for realizing the transmission/reception of time information in the Unexamined Japanese Patent Application Kokai Publication No. 2009-118403 is that the connection is established as described above. Therefore, the wrist watch type terminal device has to be so programmed as to send advertisement at a timing corresponding to a user operation or an internal event that occurs periodically in the cell-phone device.

The Unexamined Japanese Patent Application Kokai Publication No. 2009-118403 describes embodiments in all of which the cell-phone device and wrist watch type terminal device deal with each other on a one-to-one basis. In other words, no embodiment is described in which the cell-phone device time-synchronizes multiple wrist watch type terminal devices.

Generally, specification for simultaneously connecting multiple wrist watch type terminals to the same cell-phone device is complex and the necessity of such a configuration is rare. Therefore, presumably, the cell-phone device in the Unexamined Japanese Patent Application Kokai Publication No. 2009-118403 is specified to establish connection to one wrist watch type terminal device at a time where there are multiple wrist watch type terminal devices to connect.

Moreover, normally, the initial value for timing transmission of advertisement for automatic time correction (the automatic time correction time) is set to the same time for all wrist watch type terminal devices. This is because even if the initial values for the timing are randomly set, the timings may overlap and some difficulty in mass production may arise.

Therefore, when the cell-phone device time-synchronizes multiple wrist watch type terminal devices in the time correction system of the Unexamined Japanese Patent Application Kokai Publication No. 2009-118403, the timings of connection for automatic time correction of multiple wrist watch type terminal devices are set to the same time (for example, 5:00 AM) in some cases. In such cases, the multiple wrist watch type terminal devices send advertisement to the cell-phone device all at once at the timing of connection. However, the cell-phone device cannot establish connection to multiple wrist watch type terminal devices at the same time; therefore, unsuccessful connection occurs. As unsuccessful connection occurs, the wrist watch type terminal device is not time-synchronized.

SUMMARY

Thus, the present disclosure is made with the view of the above circumstances and an objective of the disclosure is to provide a wireless communication device and the like realizing time synchronization even where there are multiple wireless communication devices to time-synchronize.

In order to achieve the above objective, the wireless communication device according to a first exemplary aspect of the present disclosure is a wireless communication device comprising a processor, wherein the processor measures time;

acquires time information from another wireless communication device and corrects the measured time;

sends timing information presenting a timing of acquiring the time information to the other wireless communication device; and receives notice of change of the timing information from the other wireless communication device and changes a setting of the timing information based on the notice of change.

Moreover, in order to achieve the above objective, the wireless communication method according to a second exemplary aspect of the present disclosure comprises:

a timing information reception step of receiving from a wireless communication device timing information presenting a timing of the wireless communication device acquiring time information;

a determination step of determining whether the timing presented by the timing information received in the timing information reception step overlaps with a timing presented by timing information of another wireless communication device other than the wireless communication device;

a timing information change step of changing the timing presented by the timing information when the overlapping is determined in the determination step; and a change notification step of sending to the wireless communication device notice of change to change a setting of the timing information of the wireless communication device based on the changed timing information.

BRIEF DESCRIPTION OF THE DRAWINGS

A more complete understanding of this application can be obtained when the following detailed description is considered in conjunction with the following drawings, in which.

DETAILED DESCRIPTION

Embodiment

Figure 1:
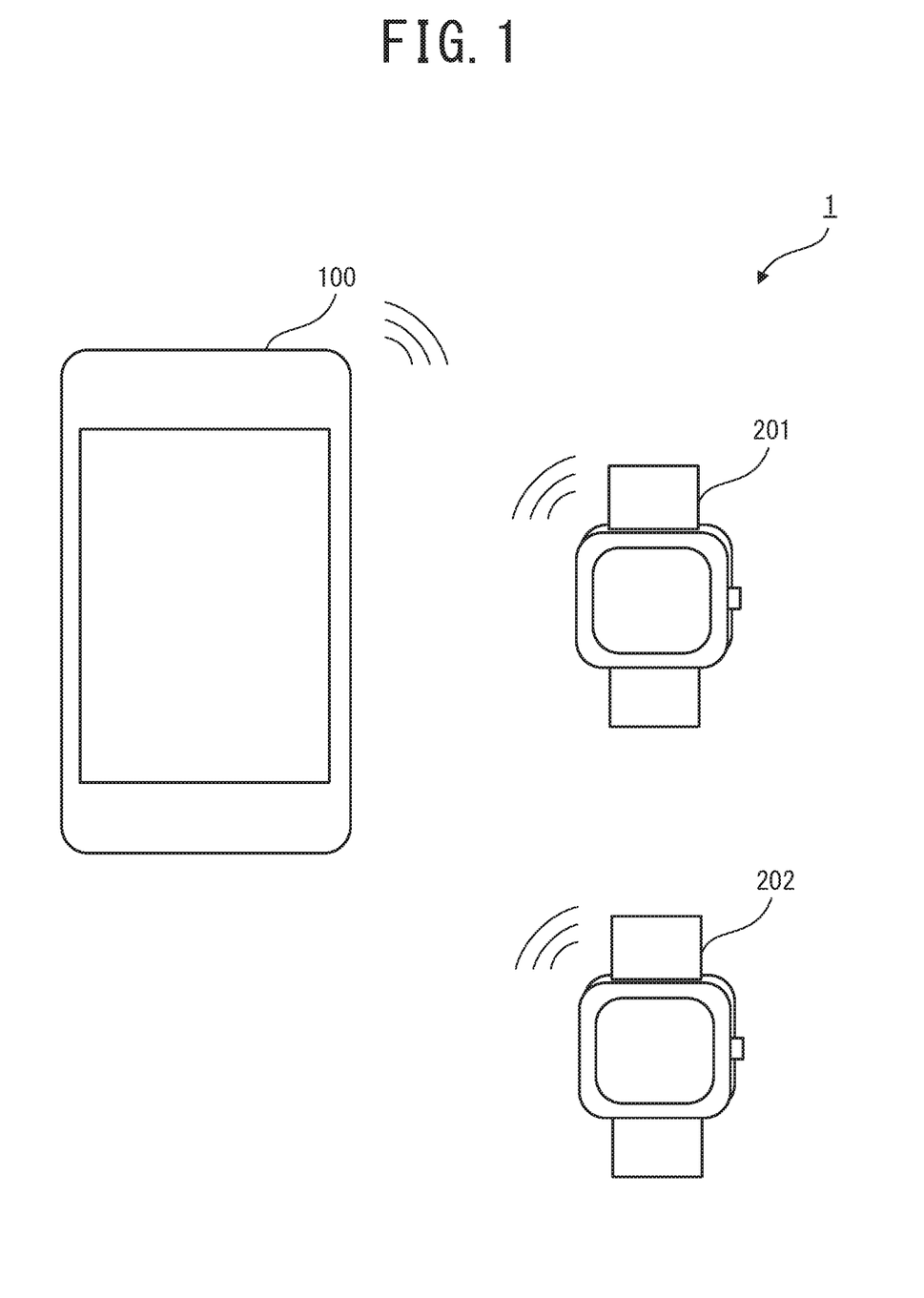
FIG. 1 is an illustration showing an exemplary configuration of the wireless communication system according to an embodiment.

An embodiment of the present disclosure will be described hereafter with reference to the drawings. As shown in FIG. 1, a wireless communication system 1 according to an embodiment of the present disclosure comprises a central 100 that is a wireless communication device, and multiple peripherals 201 and 202 that are other wireless communication devices different from the central 100.

The central 100 and peripherals 201 and 202 wirelessly communicate with each other based on the Bluetooth (registered trademark) low energy (the BLE, hereafter). The BLE is a standard (mode) designed for the purpose of low power consumption among the short distance wireless communication standards called Bluetooth (registered trademark).

Here, the central 100 provides service to the peripherals 201 and 202. The peripherals 201 and 202 use the service provided by the central 100.

The central 100 and peripherals 201 and 202 are each, for example, a portable terminal capable of wireless communication based on the BLE such as a cell-phone, smart-phone, tablet type personal computer, note type personal computer, and timepiece.

In this embodiment, by way of example, the central 100 is a smart-phone and the peripherals 201 and 202 are each an electronic timepiece receiving from the central 100 and displaying on a display 250 various data.

Figure 2:
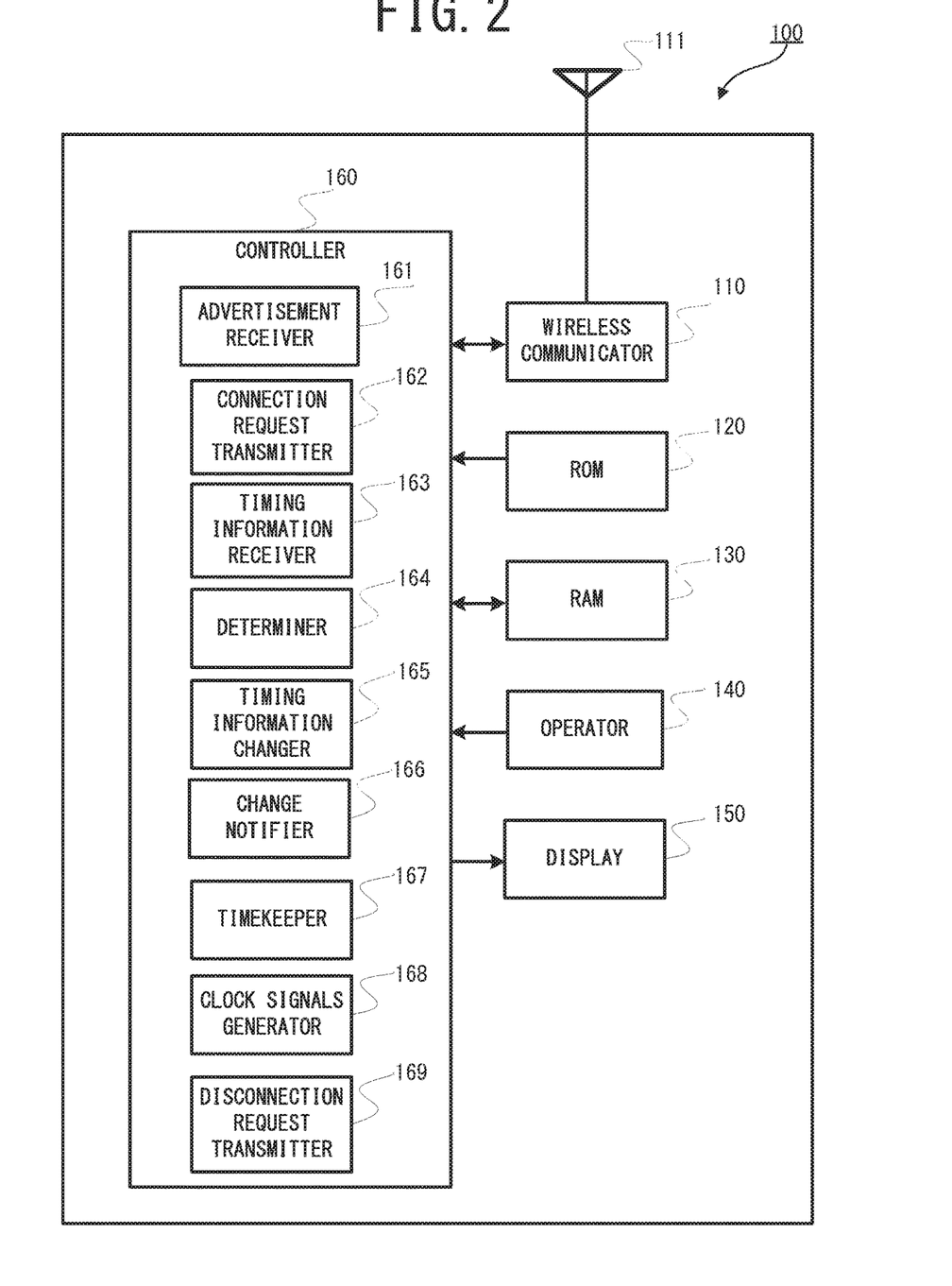
FIG. 2 is a block diagram showing an exemplary configuration of the central according to the embodiment.

The configuration of the central 100 according to this embodiment will be described hereafter. As shown in FIG. 2, the central 100 comprises a wireless communicator 110, a read only memory (ROM) 120, a random access memory (RAM) 130, an operator 140, a display 150, and a controller 160.

The wireless communicator 110 comprises, for example, a radio frequency (RF) circuit, base band (BB) circuit, large scale integration (LSI) circuit, or the like. The wireless communicator 110 sends/receives signals via an antenna 111 and conducts BLE-based wireless communication with the peripherals 201 and 202 that are other wireless communication devices.

The ROM 120 comprises a nonvolatile memory such as a flash memory and stores programs and various data (for example, timing information and/or clock rate information received from the peripherals 201 and 202) for the controller 160 to control various functions.

The RAM 130 comprises a volatile memory and is used as the work area in which the controller 160 temporarily stores data for conducting various operations.

The operator 140 comprises a touch panel and the like, and serves as an interface used by the user for entering orders.

The display 150 comprises, for example, a liquid crystal display (LCD), electroluminescence (EL) display, or the like, and displays images according to image data entered from the controller 160.

The controller 160 comprises, for example, a central processing unit (CPU). The controller 160 executes various programs stored in the ROM 120 (for example, the program for realizing the control procedure described later) to control the entire operation of the central 100.

The functional configuration of the controller 160 of the central 100 is described next. The controller 160 functions as an advertisement receiver 161, a connection request transmitter 162, a timing information receiver 163, a determiner 164, a timing information changer 165, a change notifier 166, a timekeeper 167, a clock signals generator 168, and a disconnection request transmitter 169.

The advertisement receiver 161 receives advertisement sent from the peripherals 201 and 202 via the antenna 111 and wireless communicator 110 based on a scan order. Here, the advertisement is notification information for the peripherals 201 and 202 to give notice of presence of themselves. A user operation for the scan order may possibly be, for example, activating an application for using service of the central 100. Moreover, the scan order is not limited to a user operation and may be made periodically after the application is activated. Here, the advertisement receiver 161 corresponds to notification information reception means.

The connection request transmitter 162 sends a connection request for requesting connection of the peripherals 201 and 202 via the wireless communicator 110 and antenna 111. The connection request is sent when the connection is necessary after the advertisement sent from the peripherals 201 and 202 is received. However, the central 100 cannot establish connection to multiple peripherals 201 and 202 at the same time. Therefore, the connection request is sent to either one of the multiple peripherals 201 and 202. Here, the connection request transmitter 162 corresponds to connection request means.

The timing information receiver 163 receives timing information sent from the peripherals 201 and 202 via the antenna 111 and wireless communicator 110. Here, the timing information is information presenting a timing of the peripheral 201 or 202 connecting to the central 100 and acquiring the time information from the central 100. The received timing information is stored in the ROM 120 in association with identification information of the transmission source peripheral.

The determiner 164 determines whether the timing presented by the timing information received by the timing information receiver 163 from a peripheral (for example, the peripheral 201) overlaps with the timing presented by the timing information already received from another peripheral (for example, the peripheral 202).

When there is no timing information already received from another peripheral, the determiner 164 determines that there is no overlapped timing without the necessity of comparing the timing presented by the received timing information with the timing presented by other timing information. The determiner 164 determines that there is no overlapped timing when null data are received from a peripheral instead of timing information as well.

Here, the null data means empty data and are sent from a peripheral when no timing information is sent because it falls on the timing of acquiring time information. The determiner 164 determines that there is an overlapped timing not only when the timings are the same but also when the timings are shifted from each other by less than a given time period.

Here, the given time period is a time period set in consideration of the time required for the control procedure described later from establishment of connection to disconnection. This is set so that the time for a peripheral (for example, the peripheral 202) to communicate with the central 100 does not overlap with the time for another peripheral (for example, the peripheral 201) to communicate with the central 100. Here, the determiner 164 corresponds to determination means.

When the determiner 164 determines that there is an overlapping (duplication), the timing information changer 165 changes the timing presented by the received timing information. The timing is changed by shifting the timing presented by the received timing information by a specific interval to a timing later than the timing presented by the timing information of another peripheral (for example, the peripheral 201).

The specific interval is a time period equal to or longer than the above-mentioned given time period and, for example, two minutes. Moreover, the controller 160 stores the timing information having the timing changed in the ROM 120 in association with identification information of the transmission source peripheral (for example, the peripheral 202). Here, the timing information changer 165 corresponds to timing information change means.

Based on the timing information changed by the timing information changer 165, the change notifier 166 sends to the peripheral 201 or peripheral 202 that is the transmission source of that timing information notice of change to change the setting of the timing information of that peripheral 201 or peripheral 202 (namely, its own device). Here, the change notifier 166 corresponds to change notification means.

The timekeeper 167 comprises a counter circuit counting the number of pulses of clock signals of its own device (the central 100). The timekeeper 167 measures the time based on the counted number of pulses. Moreover, the controller 160 executes various controls at timings based on the number of pulses counted by the timekeeper 167. Here, the time measured by the timekeeper 167 is periodically corrected through time synchronization with a global positioning system (GPS) satellite or a base station by a not-shown time information acquirer. Here, the timekeeper 167 may function in a form of hardware other than the controller 160.

The clock signals generator 168 comprises a crystal oscillator generating a reference clock, a variable phase locked loop (PLL) generating clock signals of a desired frequency from the reference clock, and the like, and generates clock signals of its own device (the central 100). The frequency of the clock signals is controlled by changing the frequency dividing ratio of the variable PLL.

The disconnection request transmitter 169 sends a disconnection request for disconnection to the connected peripheral (the peripheral 201 or peripheral 202) via the wireless communicator 110. The disconnection request is sent, for example, when data communication with the connected peripheral ends or when the user conducts a disconnection operation. The disconnection request transmitter 169 corresponds to disconnection request transmission means.

Figure 3:
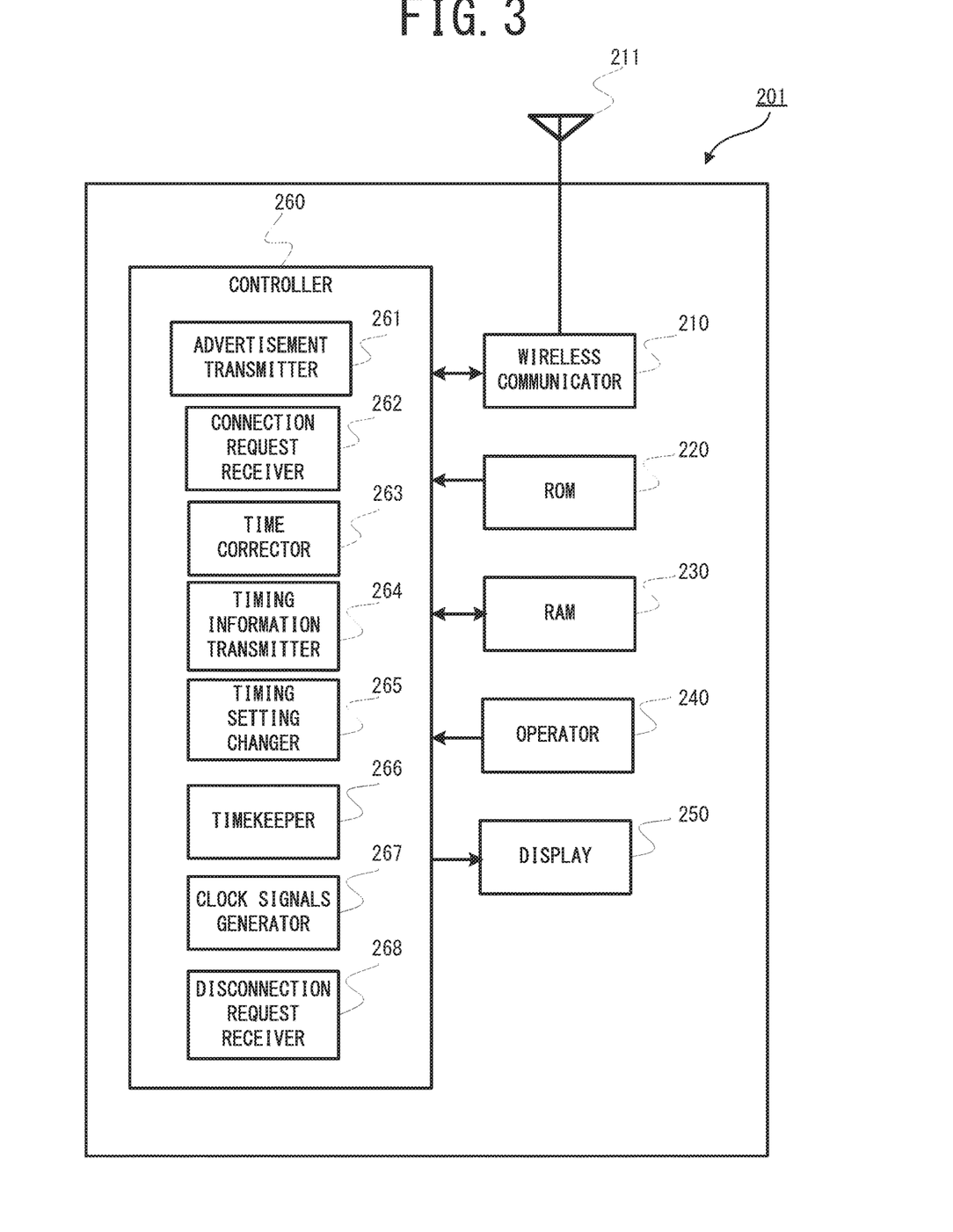
FIG. 3 is a block diagram showing an exemplary configuration of a peripheral according to the embodiment.

The configuration of the peripherals 201 and 202 according to this embodiment is described next. Here, the peripheral 201 and peripheral 202 have the same configuration and the configuration of the peripheral 201 is described as their representative example. In the following explanation, the components of the peripheral 202 are referred to by the same reference numbers of those of the peripheral 201.

As shown in FIG. 3, the peripheral 201 comprises a wireless communicator 210, a ROM 220, a RAM 230, an operator 240, a display 250, and a controller 260.

The wireless communicator 210 comprises, for example, an RF circuit, BB circuit, LSI, or the like. The wireless communicator 210 conducts BLE-based wireless communication with the central 100 that is another wireless communication device via an antenna 211.

The ROM 220 comprises a nonvolatile memory such as a flash memory and stores programs and data for the controller 260 to control various functions.

The RAM 230 comprises a volatile memory and is used as the work area in which the controller 260 temporarily stores data for conducting various operations.

The operator 240 comprises buttons, switches, and the like, and serves as an interface receiving user operations.

The display 250 comprises, for example, an LCD, EL display, or the like, and displays images according to image data entered from the controller 260.

The controller 260 comprises, for example, a CPU. The controller 260 executes various programs stored in the ROM 220 (for example, the program for realizing the control procedure described later) to control the entire operation of the peripheral 201.

The functional configuration of the controller 260 of the peripheral 201 is described next. As shown in FIG. 3, the controller 260 functions as an advertisement transmitter 261, a connection request receiver 262, a time corrector 263, a timing information transmitter 264, a timing setting changer 265, a timekeeper 266, a clock signals generator 267, and a disconnection request receiver 268.

The advertisement transmitter 261 sends advertisement to the central 100 via the wireless communicator 210 and antenna 211. The advertisement is sent periodically in accordance with program processing or at the timing of a user operation occurring. Here, the advertisement transmitter 261 corresponds to notification information transmission means.

The connection request receiver 262 receives a connection request from the central 100 via the antenna 211 and wireless communicator 210 and establishes connection to the central 100. This establishment of connection enables data communication with the central 100. The connection request receiver 262 corresponds to connection request reception means.

The time corrector 263 acquires time information sent from the central 100 and corrects the time measured by the timekeeper 266 based on the time information. In other words, the time corrector 263 corrects the time measured in its own device (the peripheral 201) so as to match the time measured in the central 100. The time corrector 263 corresponds to time correction means.

The timing information transmitter 264 sends timing information to the central 100 via the wireless communicator 210 and antenna 211. The timing information is information presenting a timing of its own device (the peripheral 201) connecting to the central 100 and acquiring time information from the central 100. Moreover, it is assumed that the timing presented by the timing information is stored in the ROM 220 as a time per day, "5:00:00" (5:00 AM), in the initial state. The timing information transmitter 264 corresponds to timing information transmission means.

The timing setting changer 265 changes the setting of the timing information of its own device (the peripheral 201) to timing information presenting a changed timing based on notice of change of timing information received from the central 100. The timing setting changer 265 corresponds to timing setting change means.

The timekeeper 266 comprises a counter circuit counting the number of pulses of clock signals of its own device (the peripheral 201). The timekeeper 266 measures the time based on the counted number of pulses. The time measured by the timekeeper 266 is corrected as appropriate by the time corrector 263 as described above. Moreover, the controller 260 executes various controls at timings based on the number of pulses counted by the timekeeper 266.

The clock signals generator 267 comprises a crystal oscillator generating a reference clock, a variable PLL generating clock signals of a desired frequency from the reference clock, and the like, and generates clock signals of its own device (the peripheral 201). The frequency of the clock signals is controlled by changing the frequency dividing ratio of the variable PLL.

The disconnection request receiver 268 receives a disconnection request for disconnection from the central 100 via the antenna 211 and wireless communicator 210, and disconnects from the central 100. The disconnection request receiver 268 corresponds to disconnection request reception means.

Figure 4:
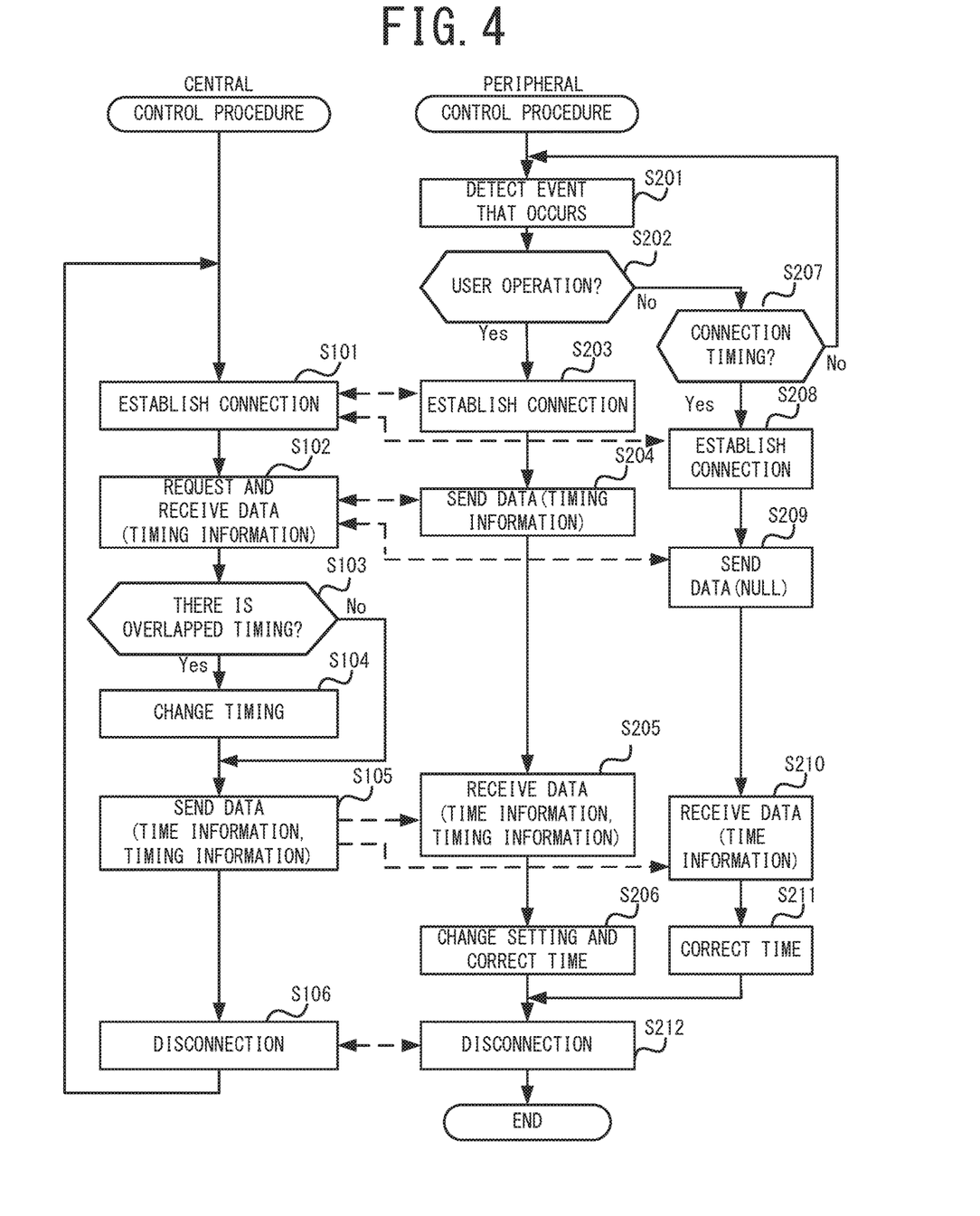
FIG. 4 is a flowchart showing examples of the control procedures to correct the time and change the timing information.

The control procedures for the central 100 and peripherals 201 and 202 to correct the time and change the timing information are described next with reference to FIG. 4.

In the following explanation, a case in which the central 100 and peripheral 201 first execute the entire control procedures and then the central 100 and peripheral 202 execute the entire control procedures will be described. Moreover, it is assumed that no timing information of the peripherals is stored in the ROM 120 of the central 100 at the start of the control procedures. In other words, it is assumed that the first peripheral from which the central 100 acquires timing information is the peripheral 201 and the second peripheral is the peripheral 202.

First, as powered on, the peripheral 201 starts the control procedure and enables the controller 260 to detect occurrence of various events. Various events occur when the user conducts given operations or at the timings of executing controls based on program processing. Here, the given user operations are, for example, an operation to pair the central 100 and peripheral 201 (initial authentication), an operation to launch a program of the peripheral 201, and the like.

Here, when any of various events occurs, the controller 260 of the peripheral 201 detects the event that has occurred (Step S201). Detecting the event, the controller 260 of the peripheral 201 identifies what is the event. First, the controller 260 of the peripheral 201 determines whether the trigger of the control procedure (namely, the event) is a given user operation (Step S202).

First, the case of being determined to be a given user operation (Step S202; Yes) is entirely described. In such a case, the advertisement transmitter 261 of the peripheral 201 sends advertisement to the central 100, and the connection request receiver 262 of the peripheral 201 receives a connection request from the central 100 and establishes connection to the central 100 (Step S203). On the other hand, the advertisement receiver 161 of the central 100 scans the channel of a frequency band in which the advertisement is sent to receive the advertisement sent from the peripheral 201, and the connection request transmitter 162 of the central 100 sends a connection request to the peripheral 201 and establishes connection to the peripheral 201 (Step S101).

As the connection is established, the controller 160 of the central 100 notifies the peripheral 201 of a data request and the timing information receiver 163 of the central 100 receives timing information from the peripheral 201 (Step S102). On the other hand, the timing information transmitter 264 of the peripheral 201 sends timing information to the central 100 in response to the data request notified by the central 100 (Step S204). Here, it is assumed that the timing presented by the timing information is "5:00:00" stored in the ROM 220 of the peripheral 201 in the initial state.

Then, the determiner 164 of the central 100 determines whether the timing presented by the timing information received from the peripheral 201 overlaps with the timing presented by the timing information already received from another peripheral (Step S103).

However, as described above, no timing information is stored in the ROM 120 of the central 100 so far. Therefore, the determiner 164 of the central 100 determines that there is no overlapped timing (Step S103; No). Consequently, the timing information received from the first peripheral 201 is stored in the ROM 120 of the central 100 as it is.

Subsequently, the controller 160 (or the change notifier 166) of the central 100 sends time information and timing information to the peripheral 201 (Step S105). On the other hand, the controller 260 of the peripheral 201 receives the time information and timing information sent from the central 100 (Step S205).

The time corrector 263 and timing setting changer 265 of the peripheral 201 corrects the time measured by the timekeeper 266 and changes the setting of the timing information based on the received time information and timing information (Step S206). However, no change was made to the timing in the timing information as described above; therefore, actually, the same timing information is overwritten.

Subsequently, the disconnection request transmitter 169 of the central 100 sends a disconnection request to the peripheral 201 and disconnects the peripheral 201 (Step S106). On the other hand, the disconnection request receiver 268 of the peripheral 201 receives the disconnection request from the central 100 and disconnects the central 100 (Step S212).

Then, the control procedures of the central 100 and peripheral 201 once end. Now, the central 100 is available for the control procedure with another peripheral other than the peripheral 201 (namely, the peripheral 202).

The processing in the case of being determined to be a given user operation in the Step S202 (Step S202; Yes) is described above. The processing in the case of being determined not to be a given user operation in the Step S202 (Step S202; No) is described next.

When it is not a given user operation, the peripheral 201 first determines whether the current time falls on the timing presented by the timing information (connection timing) (Step S207). If it is not the connection timing (Step S207; No). The peripheral 201 waits for the connection timing coming.

If the current time falls on the connection timing (Step S207; Yes), the advertisement transmitter 261 of the peripheral 201 sends advertisement to the central 100, receives a connection request from the central 100, and establishes connection to the central 100 (Step S208). On the other hand, the advertisement receiver 161 of the central 100 scans the channel of a frequency band in which the advertisement is sent to receive the advertisement sent from the peripheral 201, and the connection request transmitter 162 of the central 100 sends a connection request to the peripheral 201 and establishes connection to the peripheral 201 (Step S101).

As the connection is established, the timing information receiver 163 of the central 100 notifies the peripheral 201 of a data request and receives null data from the peripheral 201 (Step S102). On the other hand, the timing information transmitter 264 of the peripheral 201 sends the null data in response to the data request notified by the central 100 (Step S209).

Then, the determiner 164 of the central 100 determines whether the timing presented by the timing information received from the peripheral 201 overlaps with the timing presented by the timing information already received from another peripheral (Step S103).

However, as described above, the central 100 has received the null data, not timing information, from the peripheral 201. Therefore, the determiner 164 of the central 100 determines that there is no overlapped timing (Step S103; No).

Subsequently, the controller 160 of the central 100 sends time information to the peripheral 201 (Step S105). On the other hand, the peripheral 201 receives the time information sent from the central 100 (Step S210).

The time corrector 263 of the peripheral 201 corrects the time measured by the timekeeper 266 based on the received time information (Step S211).

Subsequently, the disconnection request transmitter 169 of the central 100 sends a disconnection request to the peripheral 201 and disconnects the peripheral 201 (Step S106). On the other hand, the disconnection request receiver 268 of the peripheral 201 receives the disconnection request from the central 100 and disconnects the central 100 (Step S212).

Then, the control procedures of the central 100 and peripheral 201 once end. Now, the central 100 is available for the control procedure with another peripheral other than the peripheral 201 (namely, the peripheral 202). The processing in the case of being determined not to be a given user operation in the above Step S202 (Step S202; No) is described above.

The control procedures the central 100 and peripheral 202 start after the control procedures of the central 100 and peripheral 201 end are described next. For easier understanding, matters duplicated with the above-described control procedures of the central 100 and peripheral 201 are omitted in the following explanation.

First, as in the above case of the peripheral 201, the controller 260 of the peripheral 202 starts the control procedure and detects various events (Step S201). As an event is detected, the controller 260 of the peripheral 202 identifies what is the event.

First, the controller 260 of the peripheral 202 determines whether the trigger of the control procedure (namely, the event) is a given user operation (Step S202).

The following explanation will be made in regard only to the case of being determined to be a given user operation (Step S202; Yes). The processing in the case of being determined not to be a given user operation (Step S202; No) is the same processing as in the above case of the peripheral 201 and therefore its explanation is omitted.

First, the peripheral 202 and central 100 send/receive advertisement and a connection request and establish connection as in the above case of the peripheral 201 (Steps S203 and S101).

As the connection is established, the controller 160 of the central 100 notifies the peripheral 202 of a data request and the timing information receiver 163 of the central 100 receives timing information from the peripheral 202 (Step S102). On the other hand, the timing information transmitter 264 of the peripheral 202 sends timing information to the central 100 in response to the data request notified by the central 100 (Step S204). Here, it is assumed that the timing presented by the timing information is "5:00:00" stored in the ROM 220 of the peripheral 202 in the initial state.

Then, the determiner 164 of the central 100 determines whether the timing presented by the timing information received from the peripheral 202 overlaps with the timing presented by the timing information already received from another peripheral (Step S103).

Here, the timing information already received from the peripheral 201 is stored in the ROM 120 of the central 100. Therefore, the determiner 164 of the central 100 compares the timing information of the peripheral 201 stored in the ROM 120 with the timing information received from the peripheral 202 this time.

As a result, the timing presented by the timing information received from the peripheral 202 this time is the same "5:00:00" as the timing presented by the timing information of the peripheral 201. Therefore, the determiner 164 of the central 100 determines that there is an overlapped timing (Step S103; Yes).

In such a case, the timing information changer 165 of the central 100 shifts the timing presented by the timing information received from the peripheral 202 by the above-mentioned given time period (2 minutes in this case) to change the timing from "5:00:00" to "5:02:00" (Step S104). The central 100 stores the changed timing information in the ROM 120.

Subsequently, the controller 160 (or the change notifier 166) of the central 100 sends time information and the changed timing information (notice of change) to the peripheral 202 (Step S105). On the other hand, the controller 260 of the peripheral 202 receives the time information and timing information (notice of change) sent from the central 100 (Step S205).

The time corrector 263 and timing setting changer 265 of the peripheral 202 corrects the time measured by the timekeeper 266 and changes the setting of the timing information based on the received time information and changed timing information (Step S206).

Subsequently, the disconnection request transmitter 169 of the central 100 sends a disconnection request to the peripheral 202, and the disconnection request receiver 268 of the peripheral 202 receives the disconnection request from the central 100 and disconnects the central 100 (Steps S106 and S212).

Then, the control procedures of the central 100 and peripheral 202 once end. Now, the central 100 is available for the control procedure with another peripheral other than the peripherals 201 and 202 (none in this embodiment).

As described above, the peripherals 201 and 202 send to the central 100 timing information presenting a timing of acquiring time information. The central 100 changes the timing in the received timing information so that the timing presented by the timing information received from a peripheral (for example, the peripheral 202) does not overlap with the timing presented by the already received timing information of another peripheral (for example, the peripheral 201). Moreover, the central 100 makes the peripheral in question (for example, the peripheral 202) change the setting of the timing information based on the changed timing information.

As described above, the wireless communication system 1 of this embodiment can prevent the timings of the peripherals 201 and 202 acquiring time information from overlapping. Consequently, it is possible to eliminate the risk of occurrence of unsuccessful connection and failed time synchronization as a result of the peripherals 201 and 202 attempting to connect to the central 100 and acquire time information at the same time.

Therefore, the wireless communication system 1 of this embodiment can realize time synchronization even if there are two peripherals (the peripherals 201 and 202) for the central 100 to time-synchronize.

An embodiment is described above. The above embodiment is given by way of example. Therefore, the specific configuration and processing details of the peripherals 201 and 202 and central 100 are not limited to those described in the embodiment. A modified embodiment of the above embodiment is described below.

Modified Embodiment

When the central 100 receives timing information from the peripherals 201 and 202 and the timings presented by the timing information received from the peripherals 201 and 202 overlap, the central 100 changes a timing by shifting the timing by a given time period or more that is set in consideration of the time required for the control procedure from establishment of connection to disconnection. The given time period is not limited to the above and may be set in consideration of clock rate information of the peripherals 201 and 202.

Figure 5:
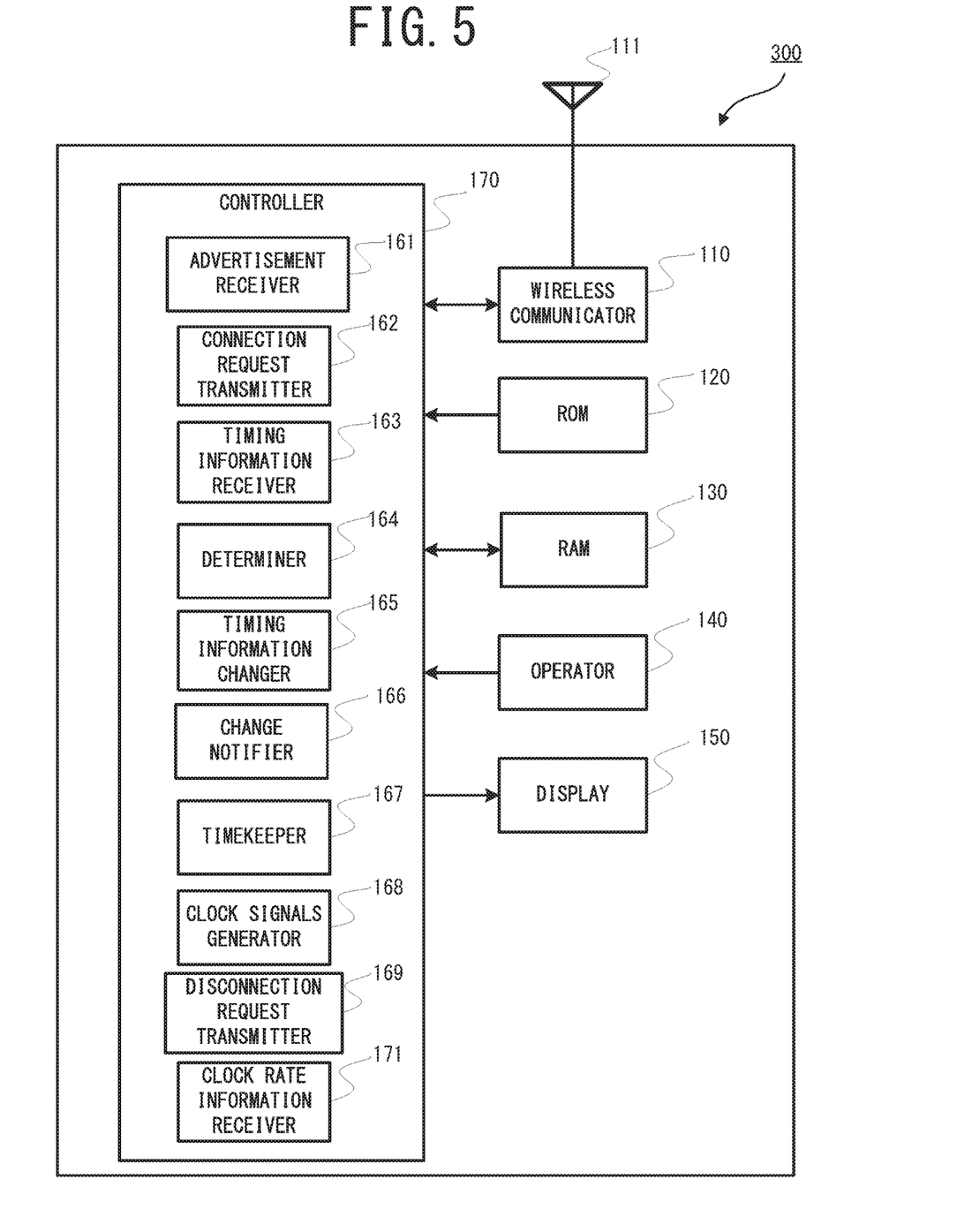
FIG. 5 is a block diagram showing an exemplary configuration of the central according to a modified embodiment.

For example, as a modified embodiment of the central 100, a central 300 is configured as shown in FIG. 5. A controller 170 of the central 300 has the same configuration as the controller 160 of the central 100 and additionally comprises a clock rate information receiver 171. The clock rate information receiver 171 corresponds to clock rate information reception means. In FIG. 5, the same components as of the central 100 are referred to by the same reference numbers.

Figure 6:
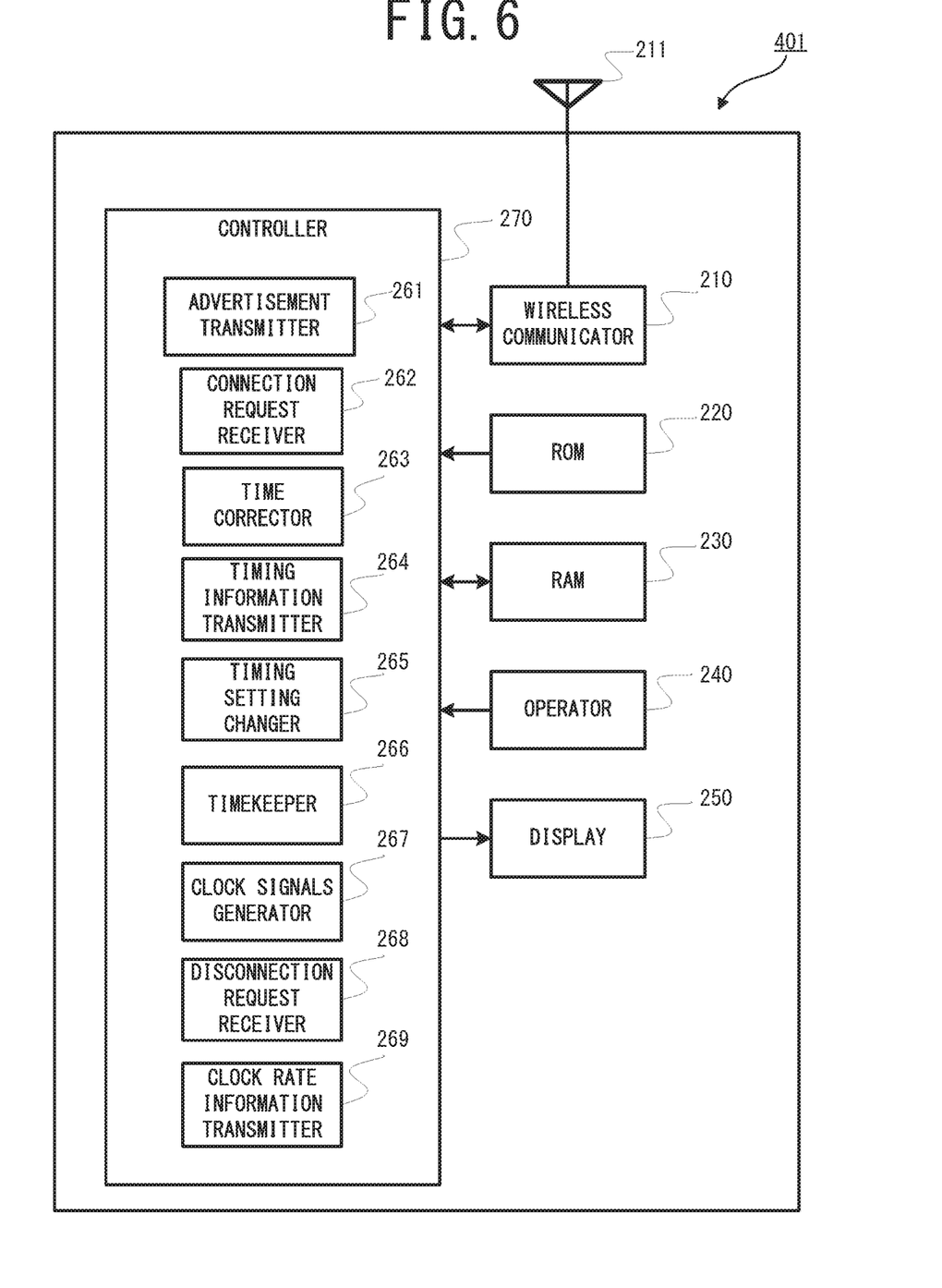
FIG. 6 is a block diagram showing an exemplary configuration of a peripheral according to the modified embodiment.

On the other hand, as a modified embodiment of the peripherals 201 and 202, a peripheral 401 is configured as shown in FIG. 6. A controller 270 of the peripheral 401 has the same configuration as the controller 260 of the peripherals 201 and 202 and additionally comprises a clock rate information transmitter 269. The clock rate information transmitter 269 corresponds to clock rate information transmission means. In FIG. 6, the same components as of the peripherals 201 and 202 are referred to by the same reference numbers.

Between the central 300 and peripheral 401 configured as described above, the peripheral 401 sends clock rate information to the central 300 and the central 300 sets a given time period based on the received clock rate information. The specific interval to shift the timing for changing the timing is set to this given time period or longer. Here, the clock rate information is information presenting the deviation of the time measured by the peripheral 401 (namely, daily rate, monthly rate, and the like).

Even when there are multiple peripherals 401 for the above-described central 300 to time-synchronize and the times measured by the multiple peripherals vary due to time deviation as a result of the daily rate, monthly rate, and the like, the intervals between the timings in the timing information of the multiple peripherals 401 are specific intervals larger than the variation. Therefore, the multiple peripherals 401 simultaneously attempting to connect to the central 300 due to deviation of the times the peripherals 400 individually measure is certainly prevented.

In the above-described embodiment, the central 100 time-synchronizes two peripherals 201 and 202. However, there may be three or more peripherals.

When there are three or more peripherals and there are two or more pieces of timing information already received in the determination of overlapped timing by the central 100 (Step S103), the timing is changed (Step S104) by shifting the timing by a specific interval (for example, 2 minutes) from the latest timing among those pieces of timing information. In other words, the settings of the timings presented by the timing information of the peripherals can be changed so that "5:00:00" is set for the first peripheral; "5:02:00," for the second peripheral; "5:04:00," for the third peripheral; and so on.

In the above-described embodiment, the timing presented by the timing information is changed to a later timing by a specific interval (for example, 2 minutes) when necessary. However, the timing may be changed to an earlier timing by a specific interval (for example, 2 minutes). Moreover, when there are three or more peripherals, the settings of the timings presented by the timing information of the peripherals may be changed so that "5:00:00" is set for the first peripheral; "4:58:00," for the second peripheral; "4:56:00," for the third peripheral; and so on. Here, the specific interval by which the timing is shifted to change is not limited to two minutes.

As described above, when the timing is shifted by a specific interval and changed either to an earlier timing or to a later timing than the timing presented by the timing information of another peripheral, there is no need of determining whether to change to an earlier timing or to a later timing at each time the timing is changed. Moreover, for a peripheral from which new timing information is received, the timing can simply be changed by shifting the timing by a specific interval always in one direction and there is no need of determining whether that timing is available. This is because shifting by an interval as small as two minutes as in the above-described embodiment allows for setting of timings of several hundred peripherals per 24 hours. Moreover, it is possible to change the settings of the timings in sequence without the necessity of deleting the timing information of a peripheral of which paring with the central 100 is canceled or taking into account a timing that accordingly becomes available. Therefore, the processing of the central 100 to change the timings can be simplified.

In the above-described embodiment, the central 100 and peripherals 201 and 202 wirelessly communicating with each other based on the BLE are used as exemplary communication devices. However, the present disclosure is not confined to a wireless communication device conducting wireless communication based on the BLE. For example, the present disclosure may be a wireless communication device conducting wireless communication based on the WiFi (registered trademark) or ZigBee (registered trademark).

Moreover, in the above-described embodiment, the determiner 164 determines that there is no overlapped timing when null data are received from the peripheral 201. This is not restrictive. For example, the determiner 164 may determine that there is no overlapped timing when no timing information or null data are received within a specific time period.

Moreover, in the above-described embodiment, when the peripheral 201 changes the setting of the timing information based on the received timing information, substantially the same timing information is overwritten if no change is made to the timing. This is not restrictive. For example, it may be possible to continue to retain the retained timing information without overwriting substantially the same timing information.

Moreover, in the above-described embodiment, the controller 160, controller 260, controller 170, and controller 270 conduct the control procedures to correct the time and change the timing information. This is not restrictive. For example, the wireless communicator 110 and wireless communicator 210 may conduct a part or all of the control procedure. In other words, the advertisement receiver 161, connection request transmitter 162, timing information receiver 163, determiner 164, timing information changer 165, change notifier 166, timekeeper 167, clock signals generator 168, disconnection request transmitter 169, clock rate information receiver 171, advertisement transmitter 261, connection request receiver 262, time corrector 263, timing information transmitter 264, timing setting changer 265, timekeeper 266, clock signals generator 267, disconnection request receiver 268, and clock rate information transmitter 269 may constitute a single controller or each individually comprise a controller to execute each operation, or the wireless communicator 110 and wireless communicator 210 may execute the operations.

Moreover, the central 100 and peripherals 201 and 202 according to the present disclosure may not be realized by the above device and, for example, a computer may realize the function of the central 100 and the function of the peripherals 201 and 202 by executing programs. The programs for realizing the function of the central 100 and the function of the peripherals 201 and 202 may be stored on a non-transitory computer-readable recording medium such as a universal serial bus (USB) memory, compact disc-read only memory (CD-ROM), digital versatile disc (DVD), and hard disk drive (HDD), or downloaded to a computer via a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A wireless communication device comprising:
   one or more processors configured to:
   measure time;
   acquire time information from another wireless communication device and correct the measured time based on the time information;
   send timing information presenting a timing of acquiring the time information to the other wireless communication device; and
   receive notice of change of the timing information from the other wireless communication device and change the timing information based on the notice of change.

2. An electronic timepiece comprising the wireless communication device according to claim 1.

3. A wireless communication method comprising:
   a timing information reception step of receiving from a first wireless communication device timing information presenting a timing of the first wireless communication device acquiring time information;
   a determination step of determining whether the timing presented by the timing information received in the timing information reception step overlaps with a timing presented by timing information of a second wireless communication device;
   a timing information change step of changing the timing presented by the timing information received in the timing information reception step in response to determining that the timing presented by the timing information received in the timing information reception step overlaps with the timing presented by the timing information of the second wireless communication device; and
   a change notification step of sending to the first wireless communication device notice of change to the timing information of the wireless communication device based on the changed timing information.

4. The wireless communication method according to claim 3, further comprising:
   a clock rate information reception step of receiving, from the first wireless communication device, clock rate information presenting deviation of the time measured by the first wireless communication device,
   wherein in the timing information change step, the timing presented by the timing information received in the timing information reception step is changed based on the clock rate information.

5. The wireless communication method according to claim 3,
   wherein in the timing information change step, the timing presented by the timing information received in the timing information reception step is changed by shifting the timing by a specific interval either to an earlier timing or to a later timing than the timing presented by the timing information of the second wireless communication device.

6. The wireless communication method according to claim 4,
   wherein in the timing information change step, the timing presented by the timing information received in the timing information reception step is changed by shifting the timing by a specific interval either to an earlier timing or to a later timing than the timing presented by the timing information of the second wireless communication device.

7. A non-transitory computer-readable recording medium on which programs are recorded, wherein the programs cause a computer to perform at least:
- a timing information reception step of receiving from a first wireless communication device timing information presenting a timing of the first wireless communication device acquiring time information;
- a determination step of determining whether the timing presented by the timing information received in the timing information reception step overlaps with a timing presented by timing information of a second wireless communication device;
- a timing information change step of changing the timing presented by the timing information received in the timing information reception step in response to determining that the timing presented by the timing information received in the timing information reception step overlaps with the timing presented by the timing information of the second wireless communication device; and
- a change notification step of sending to the first wireless communication device notice of change to the timing information of the wireless communication device based on the changed timing information.

8. The wireless communication device according to claim 1,
wherein the one or more processors are configured to:
- determine whether a predetermined user operation has been received; and
- in response to determining that the predetermined user operation has been received, send the timing information to the other wireless communication device.

9. The wireless communication device according to claim 8,
wherein the one or more processors are configured to:
- in response to determining that the predetermined user operation has not been received, determine whether the measured time is the changed timing information; and
- in response to determining that the measured time is the changed timing information, receive the time information from the other wireless communication device and correct the measured time based on the time information.

10. The wireless communication device according to claim 9,
wherein the one or more processors are configured to:
- in response to determining that the measured time is the changed timing information, send null data to the other wireless communication device, wherein the null data causes the other wireless communication device to avoid sending the notice of change of the timing information.

11. A wireless communication method comprising:
measuring time;
acquiring time information from another wireless communication device and correcting the measured time based on the time information;
sending timing information presenting a timing of acquiring the time information to the other wireless communication device; and
receiving notice of change of the timing information from the other wireless communication device and changing the timing information based on the notice of change.

12. The wireless communication method according to claim 11, comprising:
- determining whether a predetermined user operation has been received; and
- in response to determining that the predetermined user operation has been received, sending the timing information to the other wireless communication device.

13. The wireless communication method according to claim 12, comprising:
- in response to determining that the predetermined user operation has not been received, determining whether the measured time is the changed timing information; and
- in response to determining that the measured time is the changed timing information, receiving the time information from the other wireless communication device and correcting the measured time based on the time information.

14. The wireless communication method according to claim 13, comprising:
- in response to determining that the measured time is the changed timing information, sending null data to the other wireless communication device, wherein the null data causes the other wireless communication device to avoid sending the notice of change of the timing information.

15. A non-transitory computer-readable recording medium on which programs are recorded, wherein the programs cause a computer to perform at least:
measuring time;
acquiring time information from another wireless communication device and correcting the measured time based on the time information;
sending timing information presenting a timing of acquiring the time information to the other wireless communication device; and
receiving notice of change of the timing information from the other wireless communication device and changing the timing information based on the notice of change.

16. The non-transitory computer-readable recording medium according to claim 15, wherein the programs cause a computer to perform at least:
- determining whether a predetermined user operation has been received; and
- in response to determining that the predetermined user operation has been received, sending the timing information to the other wireless communication device.

17. The non-transitory computer-readable recording medium according to claim 16, wherein the programs cause a computer to perform at least:
- in response to determining that the predetermined user operation has not been received, determining whether the measured time is the changed timing information; and
- in response to determining that the measured time is the changed timing information, receiving the time information from the other wireless communication device and correcting the measured time based on the time information.

18. The non-transitory computer-readable recording medium according to claim 17, wherein the programs cause a computer to perform at least:
- in response to determining that the measured time is the changed timing information, sending null data to the other wireless communication device, wherein the null data causes the other wireless communication device to avoid sending the notice of change of the timing information.

19. The non-transitory computer-readable recording medium according to claim 7, wherein the programs cause the computer to perform:

a clock rate information reception step of receiving, from the first wireless communication device, clock rate information presenting deviation of the time measured by the first wireless communication device, wherein in the timing information change step, the timing presented by the timing information received in the timing information reception step is changed based on the clock rate information.

20. The non-transitory computer-readable recording medium according to claim 19, wherein in the timing information change step, the timing presented by the timing information received in the timing information reception step is changed by shifting the timing by a specific interval either to an earlier timing or to a later timing than the timing presented by the timing information of the second wireless communication device.

21. The non-transitory computer-readable recording medium according to claim 7, wherein in the timing information change step, the timing presented by the timing information received in the timing information reception step is changed by shifting the timing by a specific interval either to an earlier timing or to a later timing than the timing presented by the timing information of the second wireless communication device.

22. A wireless communication device comprising:

one or more processors configured to:

receive from a first wireless communication device timing information presenting a timing of the first wireless communication device acquiring time information;

determine whether the timing of the first wireless communication device acquiring time information presented by the timing information received overlaps with a timing presented by timing information of a second wireless communication device;

changing the timing of the first wireless communication device acquiring the time information presented by the timing information received in response to determining that the timing of the first wireless communication device acquiring the time information presented by the timing information overlaps with the timing presented by the timing information of the second wireless communication device; and sending to the first wireless communication device notice of change to the timing information of the wireless communication device based on the changed timing information.

23. The wireless communication device according to claim 22, wherein the one or more processors are configured to:

receive, from the first wireless communication device, clock rate information presenting deviation of the time measured by the first wireless communication device; and change the timing of the first wireless communication device acquiring the time information presented by the timing information based on the clock rate information.

24. The wireless communication device according to claim 23, wherein the one or more processors are configured to:

change the timing of the first wireless communication device acquiring the time information of the wireless communication device by shifting the timing by a specific interval either to an earlier timing or to a later timing than the timing presented by the timing information of the second wireless communication device.

25. The wireless communication device according to claim 22, wherein the one or more processors are configured to:

change the timing of the first wireless communication device acquiring the time information of the wireless communication device by shifting the timing by a specific interval either to an earlier timing or to a later timing than the timing presented by the timing information of the second wireless communication device.

* * * * *